(12) United States Patent
Ito

(10) Patent No.: US 8,823,968 B2
(45) Date of Patent: Sep. 2, 2014

(54) IMAGE FORMING APPARATUS AND METHOD FOR SETTING LICENSE INFORMATION

(75) Inventor: Akio Ito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/584,008

(22) Filed: Aug. 13, 2012

(65) Prior Publication Data

US 2013/0057896 A1 Mar. 7, 2013

(30) Foreign Application Priority Data

Sep. 2, 2011 (JP) ................................. 2011-191186

(51) Int. Cl.
*G06F 15/00* (2006.01)

(52) U.S. Cl.
USPC ........ 358/1.14; 358/1.13; 358/1.15; 713/168; 713/170

(58) Field of Classification Search
USPC .............. 358/1.13–1.16; 705/1.1, 51; 726/26; 713/168, 170
See application file for complete search history.

(56) References Cited

U.S. PATENT DOCUMENTS

| 7,130,559 B2* | 10/2006 | Kimura et al. ................. 399/109 |
| 7,212,637 B2* | 5/2007 | Salisbury ....................... 380/270 |
| 7,366,551 B1* | 4/2008 | Hartley ........................ 455/575.1 |
| 7,382,990 B2* | 6/2008 | Park et al. ....................... 399/24 |
| 8,301,886 B2* | 10/2012 | Hohberger et al. ............ 713/168 |
| 8,605,693 B2* | 12/2013 | So et al. ......................... 370/338 |
| 2007/0220255 A1* | 9/2007 | Igarashi ......................... 713/170 |
| 2008/0005029 A1* | 1/2008 | Ando ............................... 705/51 |
| 2008/0209569 A1* | 8/2008 | Araki .............................. 726/26 |
| 2008/0244057 A1* | 10/2008 | Kojima ......................... 709/223 |

FOREIGN PATENT DOCUMENTS

JP 2010-186376 A 8/2010

* cited by examiner

*Primary Examiner* — Dennis Dicker
(74) *Attorney, Agent, or Firm* — Canon U.S.A., Inc. IP Division

(57) ABSTRACT

A digital MFP includes a dual I/F storage unit including two different interfaces: an external interface (RFID) and an internal interface (bus). When the power of the digital MFP is turned ON, in steps S406 and S407, if a main controller of the digital MFP determines that license information has been written in the dual I/F storage unit from a portable terminal while the power of the digital MFP was OFF, then in step S408, the main controller validates a function of the digital MFP corresponding to the license information, by using the license information.

11 Claims, 12 Drawing Sheets

FIG.8

| FUNCTION NAME | SPECIFIC FUNCTION | ABBREVIATED NAME |
|---|---|---|
| SCANNING FUNCTION | SCANNING FUNCTION | SC1 |
| PRINT FUNCTION | 2-COLOR PRINT FUNCTION | PR1 |
| | COLOR PRINT FUNCTION | PR2 |
| TRANSMISSION FUNCTION | E-MAIL TRANSMISSION FUNCTION | SD1 |
| | FAX TRANSMISSION FUNCTION | SD2 |
| | USB MEMORY/ SD CARD TRANSMISSION FUNCTION | SD3 |
| DATA STORAGE FUNCTION | MFP STORAGE FUNCTION | DA1 |
| | SERVER STORAGE FUNCTION | DA2 |
| INTERFACE FUNCTION | USB I/F FUNCTION | IF1 |
| | CARD READER FUNCTION | IF2 |
| SECURITY FUNCTION | STORAGE DATA ENCRYPTION FUNCTION | SR1 |

FIG.10

| FUNCTION NAME | SPECIFIC FUNCTION | ABBREVIATED NAME | LICENSE ACCESS NO. | LICENSE NO. | VALID/INVALID STATUS | OPERATING STATUS |
|---|---|---|---|---|---|---|
| SCANNING FUNCTION | SCANNING FUNCTION | SC1 | SC1 xxxx xxxx xxxx | xxxx xxxx xxxx | VALID | NORMAL |
| PRINT FUNCTION | 2-COLOR PRINT FUNCTION | PR1 | PR1 xxxx xxxx xxxx | xxxx xxxx xxxx | VALID | NORMAL |
| TRANSMISSION FUNCTION | E-MAIL TRANSMISSION FUNCTION | SD1 | SD1 xxxx xxxx xxxx | xxxx xxxx xxxx | VALID | NORMAL |
| | USB MEMORY/ SD CARD TRANSMISSION FUNCTION | SD2 | — | — | INVALID | — |
| DATA STORAGE FUNCTION | MFP STORAGE FUNCTION | DA1 | DA1 xxxx xxxx xxxx | xxxx xxxx xxxx | VALID | NORMAL |
| | SERVER STORAGE FUNCTION | DA2 | — | — | INVALID | — |
| INTERFACE FUNCTION | USB I/F FUNCTION | IF1 | — | — | INVALID | — |
| | CARD READER FUNCTION | IF2 | — | — | INVALID | — |
| SECURITY FUNCTION | STORAGE DATA ENCRYPTION FUNCTION | SR1 | — | — | INVALID | — |

FIG.11

| MEMORY BLOCK | MEMORY | ACCESS VIA I2C | ACCESS VIA RFID |
|---|---|---|---|
| 0 | UNIT SERIAL NO. | READ/WRITE | READ |
| 1 | SC1 VALID<br>PR1 VALID<br>SD1 VALID<br>DA1 VALID | READ/WRITE | READ |
| 2 | SD2 VALIDATED LICENSE ACCESS NO. LICENSE NO.<br>IF1 VALIDATED LICENSE ACCESS NO. LICENSE NO. | READ/WRITE | READ/WRITE |
| 3 | | READ/WRITE | READ/WRITE |

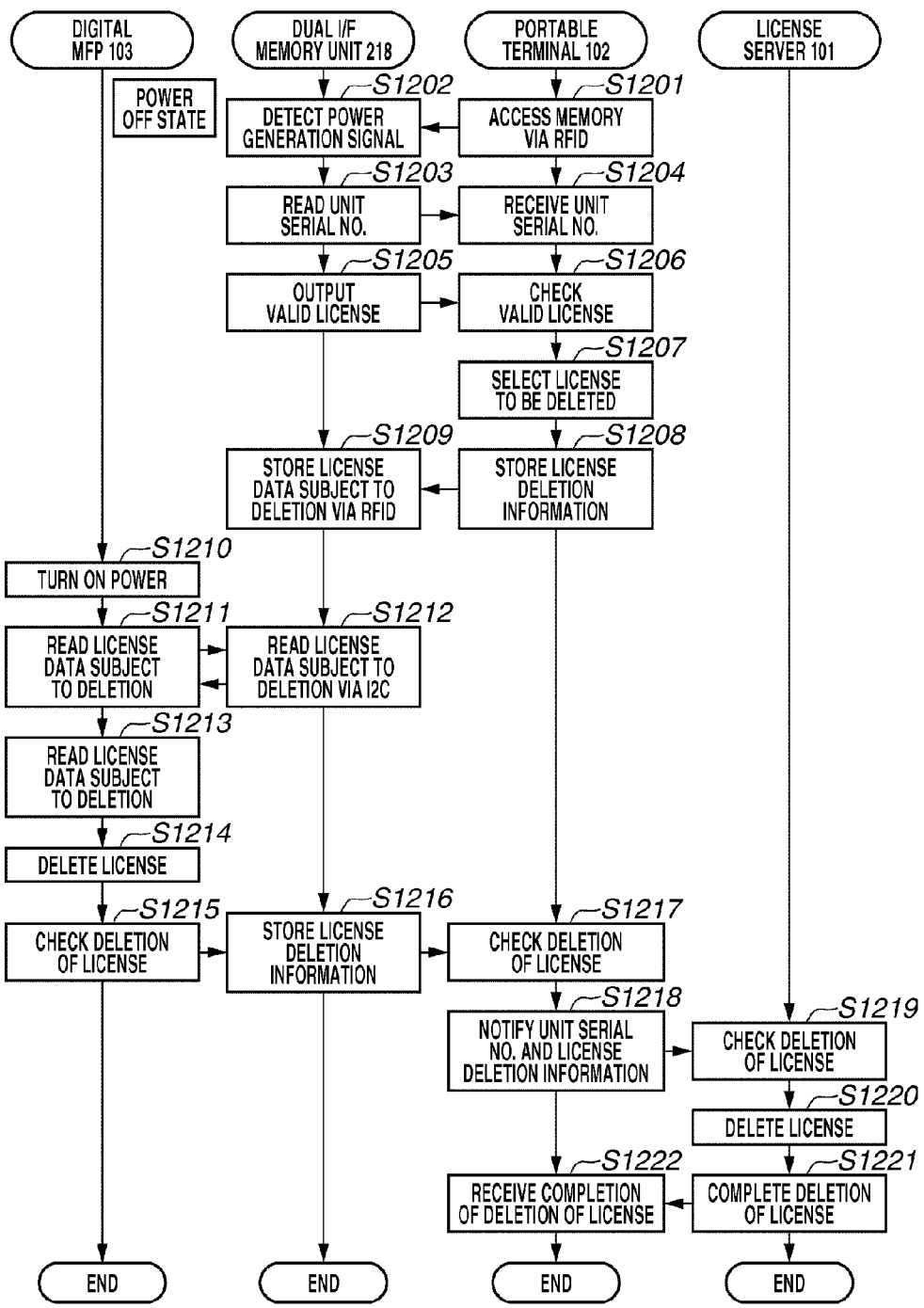

IMAGE FORMING APPARATUS AND METHOD FOR SETTING LICENSE INFORMATION

BACKGROUND OF THE INVENTION

1. Field of the Invention

The present invention relates to license setting for an application operating on an image forming apparatus.

2. Description of the Related Art

In conventional systems, specific applications are widely installed in an image forming apparatus such as a digital multifunction peripheral (MFP) placed in an office, to provide various services. When installing an application in an image forming apparatus, identification of a model of an operable image forming apparatus, valid license code input processing, and activation processing are required to prevent unauthorized operations.

There has been proposed a method for storing data including a license code in the image forming apparatus and after that performing the following license authentication.

(a) Display a license input screen on an input screen of the image forming apparatus, and prompt a user to input a license code.
(b) Transmit data stored in the image forming apparatus to an external server, have the external server determine the validity of the data, and validate the data based on a response therefrom (Japanese Patent Application Laid-Open No. 2010-186376).

However, when a method for inputting a license code from an operation unit of the image forming apparatus is employed, it is necessary to activate the image forming apparatus and input a license code from the operation unit. Depending on the image forming apparatus, it is necessary to turn OFF the power of the image forming apparatus and then turn ON again to activate a program. There has been a problem that license setting takes time in a case where the image forming apparatus needs to be reactivated repeatedly, for example, if a license code is incorrectly input or if there are many licenses to be set when the image forming apparatus is initially installed.

When a method for connecting with an external server via a network and inputting a license code to the image forming apparatus is employed, there is a problem that license code input is not possible unless a network for connecting the image forming apparatus with the external server is established.

SUMMARY OF THE INVENTION

The present invention is directed to providing a mechanism for shortening the time of setting a license code to install an application in an image forming apparatus and improving the operability of a license setting operation.

According to an aspect of the present invention, an image forming apparatus having a function of validating a license by inputting license information includes: a storage unit configured to be accessible from an external device even if the power of the image forming apparatus is OFF; and a control unit configured to, when the power of the image forming apparatus is turned ON, if license information is has been written in the storage unit from an external device while the power of the image forming apparatus was OFF, validate a function of the image forming apparatus corresponding to the license information by using the license information.

Further features and aspects of the present invention will become apparent from the following specific description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 8 illustrates example functions set in the digital MFP based on a license.

FIG. 10 illustrates an example configuration of a license database stored in a hard disk drive (HDD).

FIG. 11 illustrates an example configuration of access rights and storage data in each block of the dual I/F memory unit.

FIG. 12 is a flowchart illustrating example license deletion processing according to the present invention.

DESCRIPTION OF THE EMBODIMENTS

Various exemplary embodiments, features, and aspects of the invention will be described in detail below with reference to the drawings.

Figure 1:
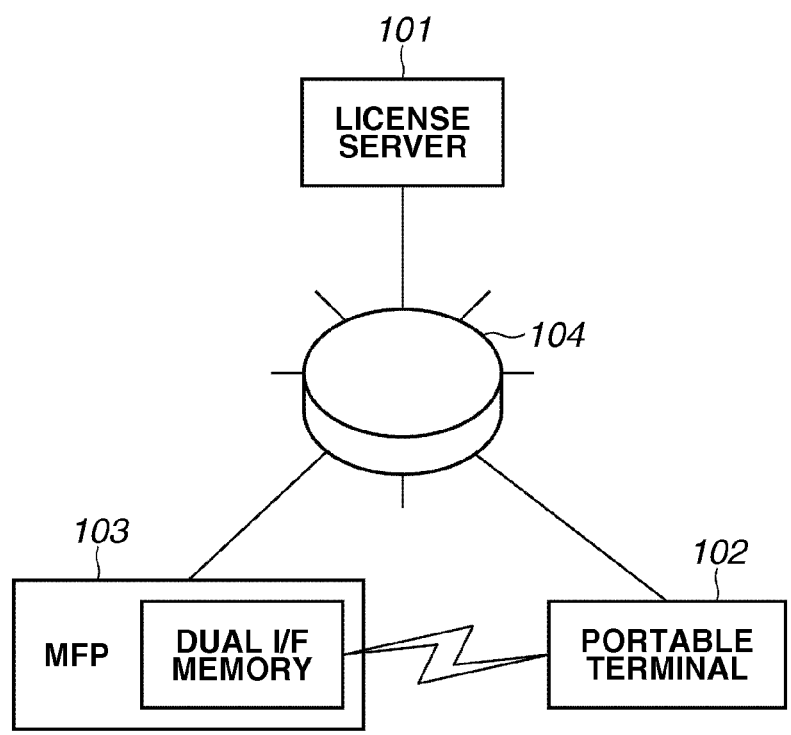
FIG. 1 is a block diagram illustrating an example configuration of a license management system to which an image forming apparatus according to an exemplary embodiment of the present invention is applicable.

FIG. 1 is a block diagram illustrating an example configuration of a license management system to which an image forming apparatus according to an exemplary embodiment of the present invention is applicable.

A license server 101 is an information processing apparatus for generally managing the license management processing. A portable terminal 102 is an information processing apparatus managed by a user, an administrator, or a service engineer. A digital MFP 103 is used and managed by a user, an administrator, or a service engineer.

A network 104 is, for example, the Internet. The portable terminal 102 is connected with the license server 101 via the network 104. Each of the portable terminal 102 and the digital MFP 103 is provided with a radio frequency identification (RFID) interface, enabling non-contact data transmission and reception even if the power of the digital MFP 103 is OFF. The digital MFP 103 will be described in detail below.

(Configuration of MFP)

Figure 2:
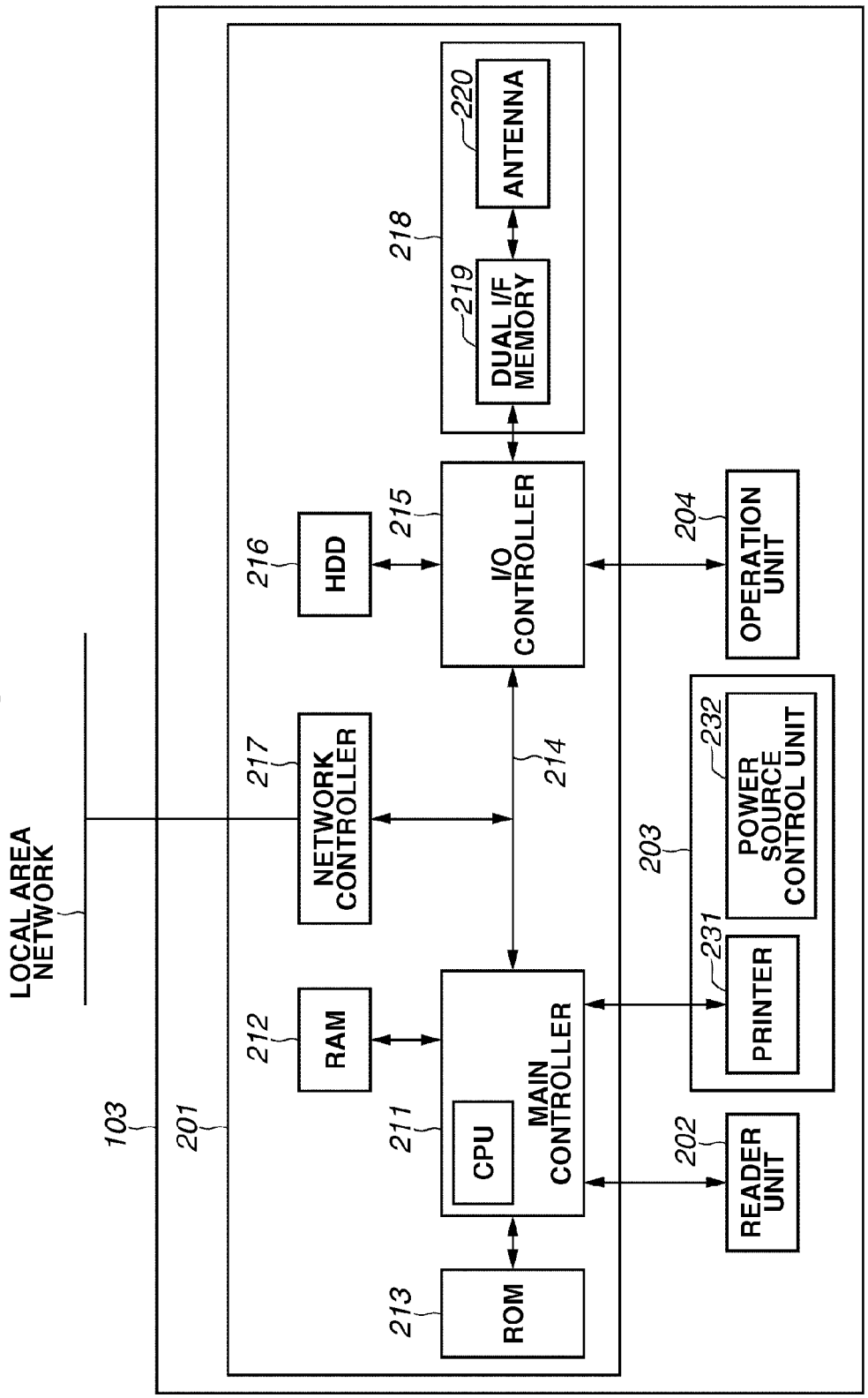
FIG. 2 is a block diagram schematically illustrating a structure of a digital MFP.

FIG. 2 is a block diagram schematically illustrating a structure of the digital MFP 103. As illustrated in FIG. 2, the digital MFP 103 is connected to a local area network (LAN) and capable of performing data printing and data transmission and reception in response to an instruction from a personal computer (PC) connected to the LAN.

The digital MFP 103 includes four units: a controller unit 201, a reader unit 202, a printer unit 203, and an operation unit 204. The controller unit 201 is connected with the reader unit 202 (an image input device) and the printer unit 203 (an image output device). The controller unit 201operation unit 20 is connected with the operation unit 204, and detects a user instruction input from the operation unit 204 and performs various processing. The controller unit 201 is further connected with the LAN to enable flexibly inputting and outputting image data and device information.

In the controller unit 201, a main controller 211 (a controller integrated circuit (IC)) includes a central processing unit (CPU) core and an image processing block, and controls the entire information processing apparatus. A random access memory (RAM) 212 serves not only as a system work memory for enabling the operation of the main controller 211 but also as an image memory for temporarily storing image data. A read-only memory (ROM) 213 is a boot ROM for storing a boot program of the system.

A system bus 214, such as a peripheral component interconnect (PCI) bus, enables high-speed transmission and reception of communication data and image data. The main controller 211 is connected to an input/output (I/O) controller 215 and a network controller 217 via the system bus 214.

The network controller 217 makes wired and wireless connection with an external network. The I/O controller 215 controls various I/O devices. The main controller 211 can access a HDD 216, the operation unit 204, and a dual interface memory unit (hereinafter referred to as dual I/F memory unit) 218 via the I/O controller 215.

The HDD 216 (a mass storage) stores system software, image data, system management data, and box management data. The operation unit 204 includes a display (not illustrated) for displaying data via the I/O controller 215. The operation unit 204 includes a touch panel and keys (not illustrated) for accepting various settings and operations for the digital MFP 103 input by the user. Upon detection of a user key input, the operation unit 204 notifies the main controller 211 of the user operation. Depending on the operation notified from the operation unit 204, the main controller 211 changes the screen displayed on the above-described display and executes processing.

The dual I/F memory unit 218 includes a dual I/F memory 219 and an antenna 220 for the RFID (hereinafter simply referred to as antenna). The dual I/F memory 219 includes two interfaces, the Inter-Integrated Circuit (I2C) bus and the RFID, each enabling data write and read operations. The I2C bus is a serial bus developed by Phillips. The two interfaces included in the dual I/F memory 219 are not limited to the I2C bus and the RFID, and may be other interfaces as long as they can be similarly accessed by devices inside or outside the digital MFP 103.

The I/O controller 215 can access the dual I/F memory unit 218 via the I2C bus. External devices can access the dual I/F memory unit 218 via the antenna 220 based on the RFID.

The dual I/F memory 219 is provided with a power supply and communication control function. Even if the internal power of the digital MFP 103 is turned OFF, with this control function the dual I/F memory 219 can be supplied with the power via the antenna 220 and accessed from outside.

Image data read by the reader unit 202 is input to the main controller 211, and temporarily stored in the RAM. 212. The main controller 211 includes a block for applying compression, decompression, and rotation processing to images, and enables accessing the image data stored in the RAM 212 to apply various processing thereto.

The image data compressed by the main controller 211 is stored in the HDD 216. The compressed image data stored in the HDD 216 can be read and decompressed by the main controller 211. Then, a relevant image can be formed on paper by the printer unit 203.

The printer unit 203 mainly includes a printer 231 for converting image data into an image on paper. Printing methods for the printer 231 include the electrophotographic method using photosensitive drums and a photosensitive belt, and the ink jet method in which ink is discharged from a minute nozzle array to print an image directly on paper. Either printing method may be used in the present invention.

The printer unit 203 includes a power control unit 232 for performing power control for the entire digital MFP 103. The power control unit 232 performs minute power control based on an instruction from the main controller 211.

(Dual I/F Memory Detailed Block Diagram)

Figure 3:
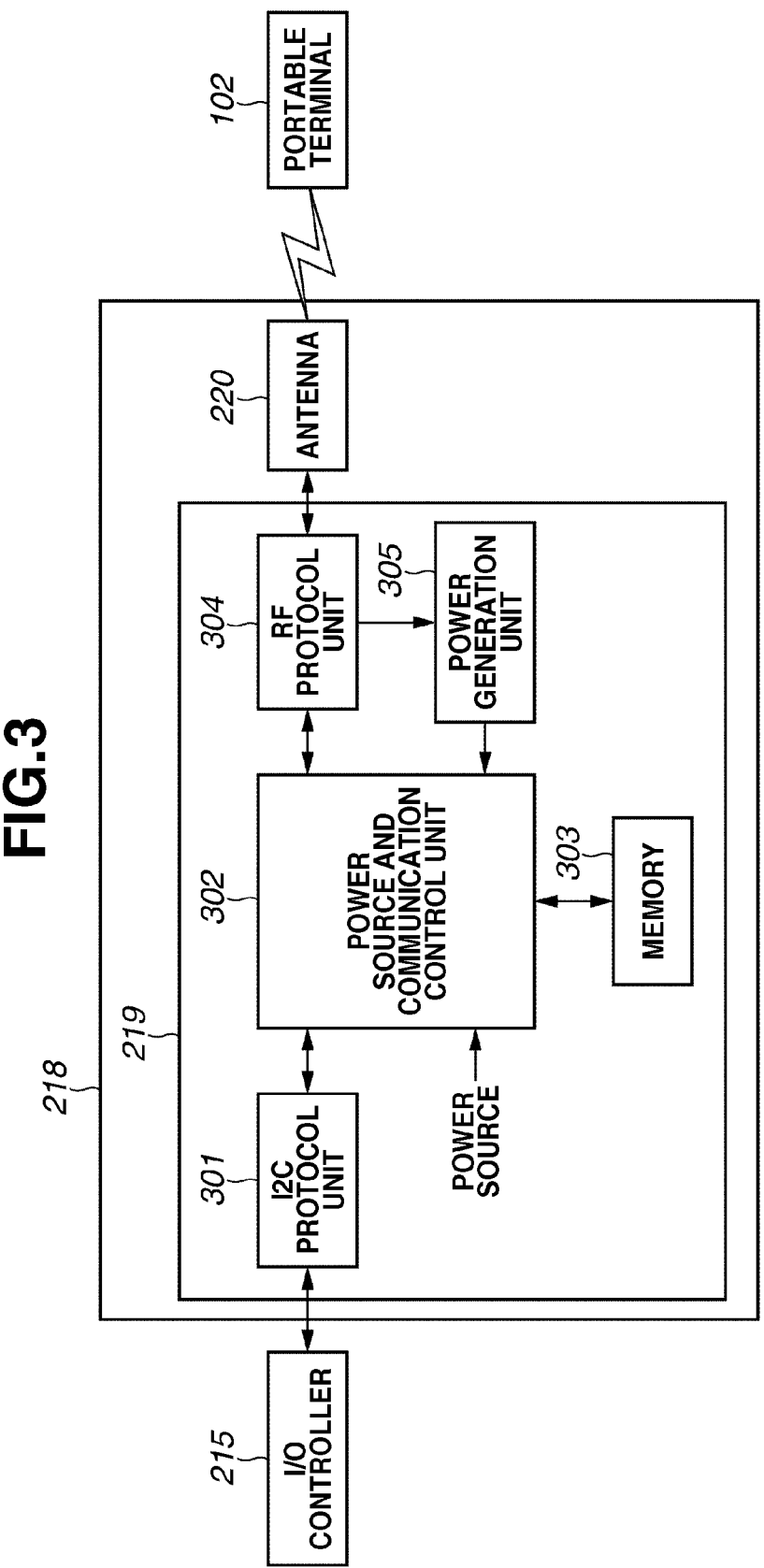
FIG. 3 is a block diagram illustrating an example detailed configuration of a dual interface (I/F) memory unit.

FIG. 3 is a block diagram illustrating an example detailed configuration of the dual I/F memory unit 218.

The dual I/F memory 219 having two interfaces, the I2C bus and a passive type RFID, enables data write and read operations. The portable terminal 102 has an active type RFID interface.

The I2C bus from the I/O controller 215 is connected to an I2C protocol unit 301. The I2C protocol unit 301 converts I2C protocol data received from the I/O controller 215 into internal access data, and transmits it to a power and communication control unit 302.

Communication data received from the portable terminal 102 having the active type RFID interface is transmitted to the power and communication control unit 302 via a radio frequency (RF) protocol unit 304 connected to the antenna 220 for RFID. A power generation unit 305 extracts the electric power from an induced electromagnetic field generated near the antenna 220, and supplies the electric power to the power and communication control unit 302.

The power and communication control unit 302 performs arbitration processing for power supply and communication input via the I2C interface and the passive type RFID interface. The arbitration processing enables read and write operations without collision in power supply and access processing from both interfaces.

The power and communication control unit 302 is provided with a password block function for preventing access to a memory 303 if communication does not conform to the predetermined communication protocol, thus protecting data in the memory 303. The memory 303 is a nonvolatile memory such as an electrically erasable programmable ROM (EEPROM).

In this configuration, even if the digital MFP 103 enters the power saving mode and the power supply via the I2C is turned OFF, the above-described configuration enables supplying the power by the induced electromagnetic field via the antenna 220, thus enabling access to the dual I/F memory 219 from outside. Specifically, the dual I/F memory 219 is a storage device wirelessly accessible from an external device such as the portable terminal 102 even if the power of the digital MFP 103 is OFF. In the dual I/F memory 219, the memory 303 can be divided into blocks according to the use, and access right via the I2C and RFID can be set for each block, as described below with reference to FIG. 11.

(License Validation Processing, Entire Flowchart)

Figure 4:
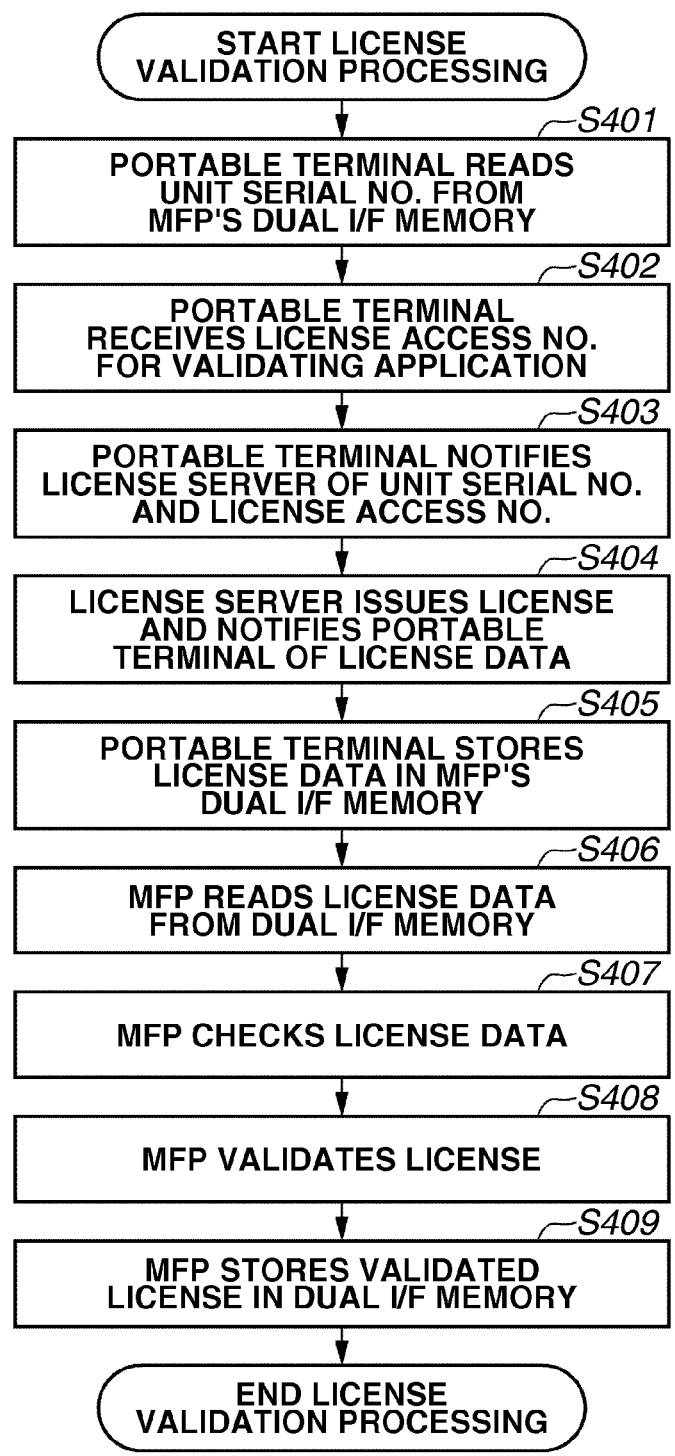
FIG. 4 is a flowchart illustrating license validation processing for the digital MFP according to the present invention.

FIG. 4 is an entire flowchart illustrating license validation processing for the digital MFP 103 according to the present invention.

In step S401, in response to a user operation, the portable terminal 102 reads the serial number of the digital MFP 103 from the dual I/F memory unit 218 of the digital MFP 103 via the RFID interface. The serial number is a unique number (individual unit identification information) for identifying an individual unit of the digital MFP 103, and is stored before shipment in the dual I/F memory unit 218 so as to be unchangeable from outside. At this time, the power of the digital MFP 103 is OFF.

In step S402, the portable terminal 102 receives a user-input license access number for validating an application from an operation unit (not illustrated) of the portable terminal 102. When the user inputs a license access number from the operation unit of the portable terminal 102, the portable terminal 102 acquires the license access number in response to the operation. The license access number (an access number issued for each license) is set to the digital MFP 103 by the license server. For example, the license access number is supplied together with a shipped product (application) as printed paper, or notified by E-mail to a user who is licensed for the application.

In step S403, the portable terminal 102 notifies via the network 104 the license server 101 of the serial number of the digital MFP 103 (hereinafter referred to as device serial number) acquired in step S401 and the license access number acquired in step S402.

In step S404, the license server 101 determines whether the serial number and the license access number notified from the portable terminal 102 in step S403 are correct with reference to a database. The license server 101 stores information in various tables (see FIGS. 5 to 7) described below to manage the digital MFP 103 and applications, and makes the above-described determination based on these pieces of information (details will be described below).

The license server 101 first determines whether the device serial number is a correct serial number. The license server 101 further determines that an already existing license access number is not incorrectly used. When the license server 101 determines that both of these numbers are correct (not used incorrectly), the license server 101 calculates the license number (issues a license) based on the device serial number and the license access number, generates license data including the calculated license number and information for identifying functions to be used by a relevant application (abbreviated names of specific functions described below), and notifies the portable terminal 102 of the license data.

In step S405, the portable terminal 102 stores in the dual I/F memory unit 218 of the digital MFP 103 via the RFID interface the license data notified from the license server 101 in step S404.

When the power of the digital MFP 103 is turned ON, in step S406, the digital MFP 103 reads through the I2C bus the data stored in the memory 303 of the dual I/F memory unit 218.

In step S407, the digital MFP 103 confirms the license data read in step S406.

In step S408, after confirming the license data in step S407, the digital MFP 103 sets the relevant application by using the confirmed license data to validate the license of the relevant application.

In step S409, the digital MFP 103 stores in the dual I/F memory unit 218 the information about the license validated in step S408 so that the information can be confirmed from the portable terminal 102.

(Device Management Table)

Figure 5:
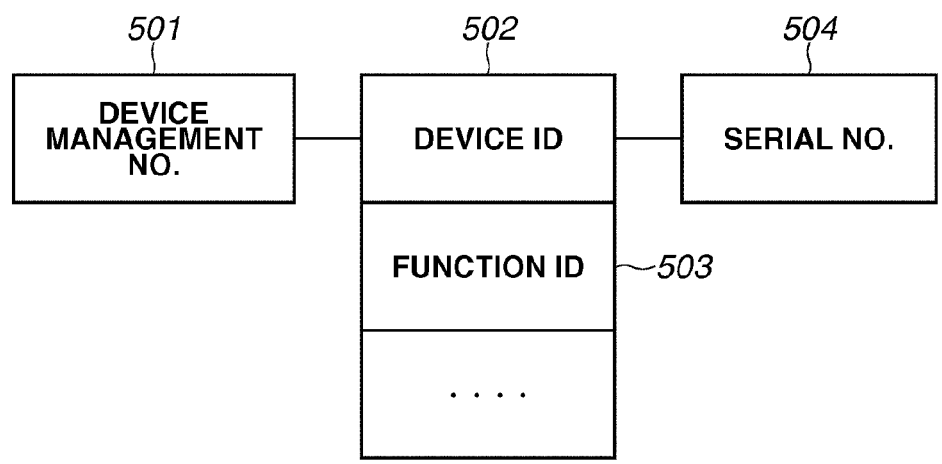
FIG. 5 illustrates an example device management table managed by a license server.

FIG. 5 illustrates an example device management table managed by the license server 101.

The license server 101 manages the information about the digital MFP 103 based on the device management table as illustrated in FIG. 5. The information in the device management table is stored in a database configured in a storage device (not illustrated), such as the hard disk in the license server 101.

As illustrated in FIG. 5, the device management table stores a device management number 501, a device identifier (ID) 502, one or a plurality of function IDs 503, and a serial number 504 for each element.

The device management number 501 is a unique number assigned to each element of the device management table. The device ID 502 is unique information assigned to each individual model of the digital MFP 103.

The function ID 503 is unique information assigned to each device function. The function ID 503 is stored within each element of the device management table. A number of the stored functions is the number provided in a device corresponding to the element. In the present exemplary embodiment, information about a function (for example, the abbreviated name illustrated in FIG. 8) is stored as the function ID 503.

The serial number 504 is a unique number for identifying an individual unit of the digital MFP 103, corresponding to the serial number read in step S401 (see FIG. 4). The information managed by the device management table is input in advance by an administrator, or acquired through communication with the digital MFP 103 via the network 104 and registered in the database by the license server 101.

(Application Management Table)

Figure 6:
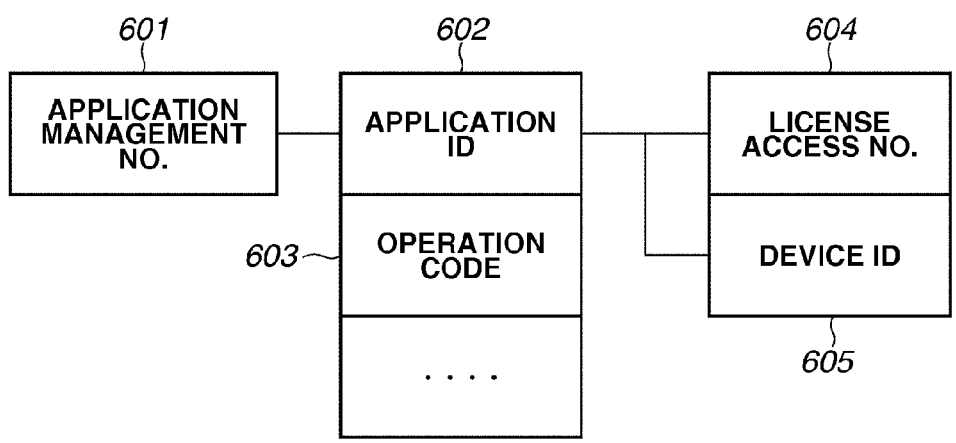
FIG. 6 illustrates an example application management table managed by the license server.

FIG. 6 illustrates an example application management table managed by the license server 101.

The license server 101 manages various information about an application based on the application management table as illustrated in FIG. 6. The information of the application management table is in a database stored on a storage device (not illustrated), such as the hard disk in the license server 101.

As illustrated in FIG. 6, the application management table stores an application management number 601, an application ID 602, one or a plurality of operation codes 603, a license access number, 604, and a device ID 605 for each element.

The application management number 601 is a unique number assigned to each element of the application management table. The application ID 602 is a unique number assigned to each application. The operation code 603 indicates a function to be used by the relevant application. The operation code 603 is defined through a logical operation for specific functions. Specifically, the operation code 603 is represented by the logical sum of bits corresponding to functions (specific functions illustrated in FIG. 8) of the digital MFP 103 to be validated for the relevant application.

The license access number 604 is packaged with an application and notified to the user, and corresponds to the license access number input by the user in step S402 (see FIG. 4). The device ID 605 is unique information assigned to each individual model for identifying an image forming apparatus adaptable to the relevant application. When there is a plurality of models adaptable to the relevant application, a plurality of device IDs 605 may be stored in the application management table.

Although not illustrated, the number of licenses permitted by the license access number may also be stored in the application management table. The information managed by the application management table is registered in the database when the license access number is issued.

(Application Management Number)

Figure 7:
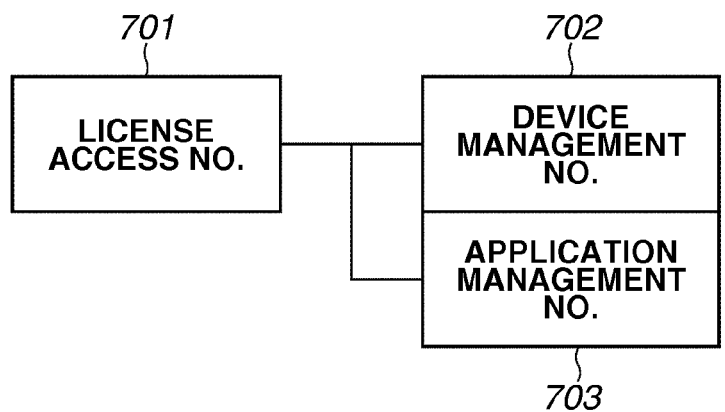
FIG. 7 illustrates an example license access number management table managed by the license server.

FIG. 7 illustrates an example license access number management table managed by the license server 101. The license access number management table associates the information of the device management table (see FIG. 5) with the information of the application management table (see FIG. 6). The license access number management table is in a database stored in a storage device (not illustrated), such as the hard disk in the license server 101.

As illustrated in FIG. 7, the license access number management table stores a license access number 701, one or a plurality of device management numbers 702, and an application management number 703 for each element. The license access number 701 is identical to the license access number 604 illustrated in FIG. 6. The device management number 702 is identical to the device management number 501 illustrated in FIG. 5. A plurality of device management numbers 702 can be stored in each element of the license access number management table. When a plurality of licenses is permitted by one license access number, a plurality of device management numbers 702 is stored in each element of the license access number management table.

The application management number 703 is identical to the application management number 601 illustrated in FIG. 6. The license access number 701 and the application management number 703 out of the information managed by the license access number management table are registered in the database when the license access number is issued. The device management number 702 is registered in the database when a license is issued, i.e., when step S911 (see FIG. 9) described below is executed.

(Functions Set on the Basis of License)

FIG. 8 illustrates example functions set in the digital MFP 103 based on license.

As illustrated in FIG. 8, the digital MFP 103 according to the present exemplary embodiment is provided with a scanning function, a print function, a transmission function, a data storage function, an interface function, and a security function as functions based on license (as optional functions).

The scanning function specifically includes a scanning function (abbreviated name SC1). The print function specifically includes two different functions: a 2-color print function (abbreviated name PR1) and a color print function (abbreviated name PR2).

The transmission function specifically includes three different functions: an e-mail transmission function (abbreviated name SD1), a FAX transmission function (abbreviated name SD2), and a USB memory/SD card transmission function (abbreviated name SD3).

The data storage function specifically includes two different functions: an MFP storage function (abbreviated name DA1) and a server storage function (abbreviated name DA1). The interface function specifically includes two different functions: a USB I/F function (abbreviated name IF1) and a card reader function (abbreviated name IF2). The security function specifically includes one function: a storage data encryption function (abbreviated name SR1).

(License Setting Flowchart)

Figure 9:
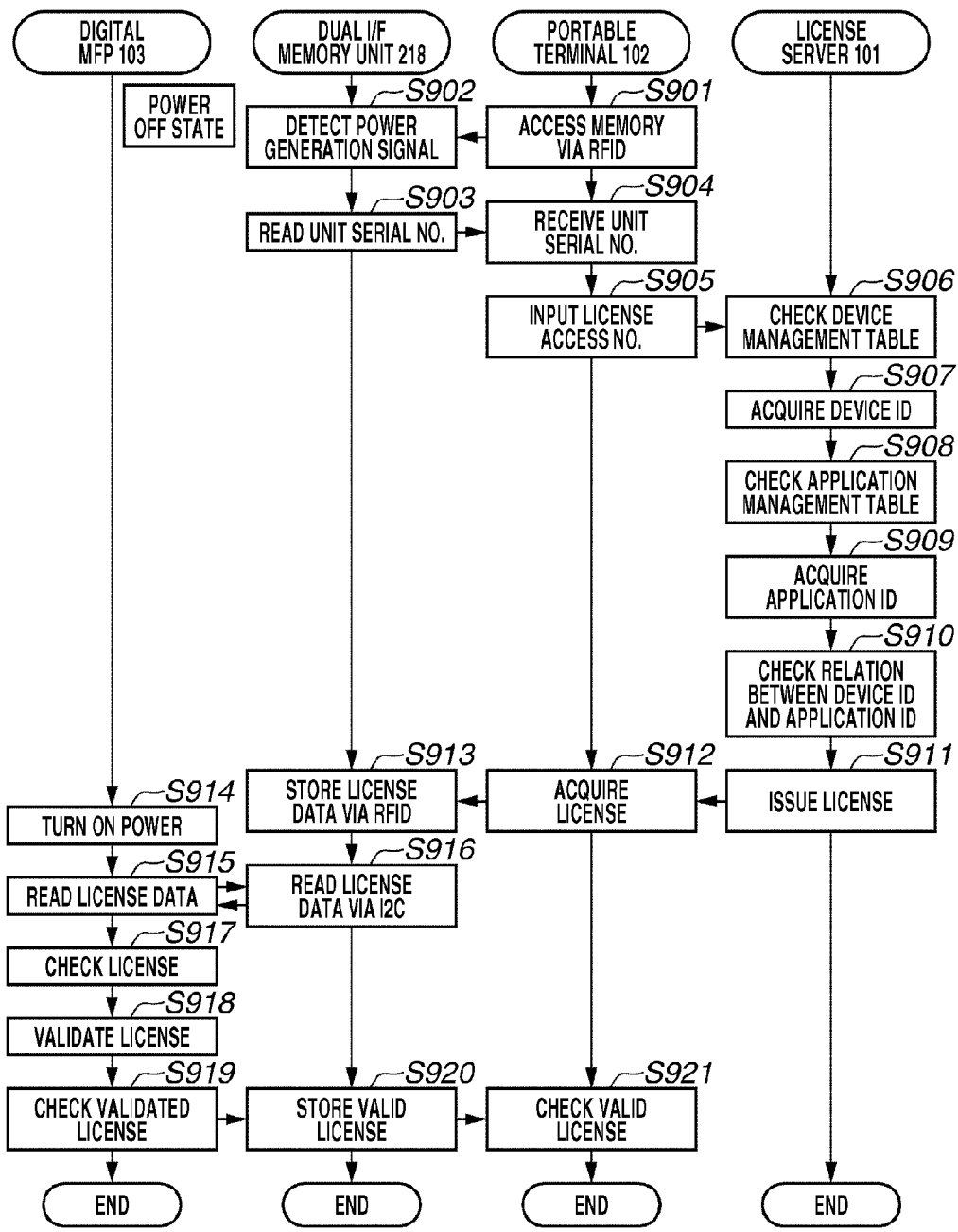
FIG. 9 is a flowchart illustrating example license setting processing according to the present invention.

FIG. 9 is a flowchart illustrating example license setting processing according to the present invention. This flowchart indicates operations of the digital MFP 103, the dual I/F memory unit 218 in the digital MFP 103, the portable terminal 102, and the license server 101.

Processing in steps S914, S915, and S917 to S919 by the digital MFP 103 is implemented when the main controller 211 of the digital MFP 103 executes a relevant program computer-readably stored in the ROM 213. Processing in steps S902, S903, S913, S916, and S920 by the dual I/F memory unit 218 is implemented when the power and communication control unit 302 of the dual I/F memory unit 218 executes a relevant program computer-readably stored in an internal storage unit (not illustrated). Processing in steps S901, S904, S905, S912, and S921 by the portable terminal 102 is implemented when a CPU (not illustrated) of the portable terminal 102 executes a relevant program computer-readably stored in a storage unit (not illustrated) of the portable terminal 102. Processing in steps S906 to S911 by the license server 101 is implemented when a CPU (not illustrated) of the license server 101 executes a relevant program computer-readably stored in a storage unit (not illustrated) of the license server 101.

Upon detection of a license setting operation input by a user from the operation unit (not illustrated) of the portable terminal 102, the CPU of the portable terminal 102 executes the processing in step S901.

In step S901, the CPU of the portable terminal 102 accesses the dual I/F memory unit 218 of the digital MFP 103 via the RFID. The portable terminal 102 is an active type RFID, and the dual I/F memory unit 218 is a passive type RFID.

In step S902, in the dual I/F memory unit 218, the antenna 220 receives an access from the portable terminal 102 (an active type RFID), the power generation unit 305 generates the power, and the power and communication control unit 302 receive a request (signal) from the portable terminal 102.

In step S903, in response to the request (a request for reading the serial number) from the portable terminal 102, the power and communication control unit 302 of the dual I/F memory 219 reads the serial number of the digital MFP 103 from memory block "0" of the memory 303 (see FIG. 11) and then notifies the portable terminal 102 of the serial number via the RFID.

In step S904, the CPU of the portable terminal 102 receives (acquires) the serial number of the digital MFP 103 from the dual I/F memory unit 218 via the RFID.

In step S905, the CPU of the portable terminal 102 receives from the operation unit (not illustrated) of the portable terminal 102 the license access number packaged with an application and input by the user. Upon detection of a license access number input by the user from the operation unit, the CPU of the portable terminal 102 executes processing for notifying the license server 101 of the serial number and the license access number. In this notification processing, the CPU of the portable terminal 102 notifies, via the network 104, the license server 101 of the serial number of the digital MFP 103 acquired in step S904 and the input license access number.

In step S906, the CPU of the license server 101 confirms in the device management table (see FIG. 5) the serial number received from the portable terminal 102. In this step, specifically, the CPU of the license server 101 searches for the received serial number in the serial number list in the device management table to confirm whether the serial number is registered in the list. If the received serial number is not registered in the license server 101, the CPU of the license server 101 executes error processing, notifies the portable terminal 102 of the relevant error, and terminates the processing of this flowchart (not illustrated). Otherwise, if the received serial number is confirmed to be registered in the license server 101, the CPU of the license server 101 identifies an element of the device management table of which the serial number has been confirmed, and advances processing to step S907.

In step S907, the CPU of the license server 101 acquires the device ID 502 and the device management number 501 from the element of the device management table identified in step S906.

In step S908, the CPU of the license server 101 confirms the application management table (see FIG. 6) based on the license access number received from the above-described portable terminal 102. In this step, specifically, the CPU of the license server 101 searches for the received license access number in the license access number list in the application management table to confirm whether the license access number is registered in the list. If the received license access number is not registered in the license server 101, the CPU of the license server 101 executes error processing, notifies the portable terminal 102 of the relevant error, and terminates the processing of this flowchart (not illustrated). Otherwise, if the received license access number is confirmed to be registered in the license server 101, the CPU of the license server 101 identifies an element of the application management table of which the license access number has been confirmed, and advances processing to step S909.

In step S909, the CPU of the license server 101 acquires the application ID 602, the application management number 601, the operation code 603, and the device ID 605 based on the element of the application management table identified in step S908.

In step S910, the CPU of the license server 101 confirms a relation between the device ID 502 acquired in step S907 and the application ID 602 acquired in step S909. In this step, specifically, the CPU of the license server 101 confirms whether the device ID 502 acquired in step S907 is associated with the application ID 602 acquired in step S909 in the application management table (see FIG. 6), i.e., whether the device ID 502 is included in the device ID 605). If the device ID 502 is not associated with the application ID 602, the CPU of the license server 101 executes error processing, notifies the portable terminal 102 of the relevant error, and terminates the processing of this flowchart (not illustrated). Otherwise, if the device ID 502 is confirmed to be associated with the application ID 602, the CPU of the license server 101 identifies the confirmed element of the application management table, and advances processing to step S911.

In step S911, the CPU of the license server 101 calculates the license number (issues a license) by using the above-described serial number and the license access number received from the portable terminal 102, and transmits to the portable terminal 102 via the network 104 license data including the abbreviated names of the specific functions (for example, SC1 and PR1 illustrated in FIG. 8) corresponding to the operation code 603 acquired in step S909. In step S911, the CPU of the license server 101 also executes processing for registering the device management number 501 acquired in step S907 in an element of the license access management table (see FIG. 7) corresponding to the above-described received license access number.

In step S912, upon reception of the license data transmitted from the license server 101 via the network 104, the CPU of the portable terminal 102 stores in the dual I/F memory 219 via the RFID an instruction for validating the specific functions included in the license data, the serial number acquired in step S904, and the license number included in the above-described license data. For example, the CPU of the portable terminal 102 stores data ("SD2 validated, license access number, license number", and "IF1 validated, license access number, license number") in memory block "2" (see FIG. 11) described below.

In step S913, the power and communication control unit 302 of the dual I/F memory unit 218 stores in memory block "2" of the memory 303 of the dual I/F memory 219 such information as the license data to be stored from the portable terminal 102 by instruction via the RFID. Since the power is generated by electromagnetic induction in the dual I/F memory unit 218 and supplied to the dual I/F memory 219 in response to a storage access from the portable terminal 102, the license data can be stored in the memory 303 even in a state where the power of the digital MFP 103 is OFF.

Executing the processing in steps S901 to S913 or the processing in steps S905 to S913 for a plurality of license access numbers enables storing in the dual I/F memory unit 218 of the digital MFP 103 a plurality of license data corresponding to the plurality of license access numbers even in the power OFF state. In step S905, the CPU of the portable terminal 102 may receive a plurality of input license access numbers and transmit the plurality of received license access numbers to the license server 101. In this case, the license server 101 executes the processing in steps S908 to S911 for each license access number.

In step S914, an operator presses a power switch (not illustrated) of the digital MFP 103 to turn ON the power of the digital MFP 103. When the main controller 211 starts activation processing according to a program stored in the ROM 213, the main controller 211 advances processing to step S915.

In step S915, according to an activation program executed when the power of the controller unit 201 is turned ON, the main controller 211 reads data from the memory 303 of the dual I/F memory unit 218 via the I2C bus and stores the data in the RAM 212.

In step S916, in response to an access via the I2C bus, the power and communication control unit 302 of the dual I/F memory unit 218 reads the data from the memory 303 and transmits it to the I/O controller 215.

In step S917, the main controller 211 compares the license data (see FIG. 10) stored in the HDD 216 of the digital MFP 103 with the license data read from the dual I/F memory unit 218 of the digital MFP 103 to confirm update data.

The license data stored in the HDD 216 of the digital MFP 103 is specifically stored in the license database (see FIG. 10) described below. The main controller 211 compares the data in the license database with the above-described license data read from the dual I/F memory unit 218 to confirm whether there is update data. If there is no update data, the main controller 211 terminates the processing of this flowchart (not illustrated). Otherwise, if there is update data, the main controller 211 advances processing to step S918.

In step S918, the main controller 211 validates the license according to the update data, decompresses the compressed data stored in the HDD 216 to install a program corresponding to the license, and activates the program. The main controller 211 stores in a record corresponding to the update data in the license database in the HDD 216 the license access number and the license number included in the update data, and sets the valid/invalid status field to "VALID", thus validating the license.

In step S919, the main controller 211 confirms whether the program validated and activated in step S918 is normally operating. When the main controller 211 determines that the program is normally operating, the main controller 211 updates the operating status of the record corresponding to the license data to "NORMAL", and stores in the dual I/F memory unit 218 via the I2C bus the information about the license which has been confirmed to be validated (valid license information). In this case, the main controller 211 deletes via the I2C bus the license data in the memory 303 of the dual I/F memory unit 218 confirmed in step S917.

Otherwise, when the main controller 211 determines that the program is not normally operating, the main controller 211 may execute error processing, invalidate the corresponding license, and store information about the invalidated license in the dual I/F memory unit 218 via the I2C bus (not illustrated).

In step S920, the power and communication control unit 302 of the dual I/F memory unit 218 stores in memory block "1" of the memory 303 of the dual I/F memory 219 the above-described valid license information to be stored by instruction via the I2C bus. For example, the power and communication control unit 302 stores data ("SC1 valid", "PR1 valid", "SD1 valid", and "DA1 valid") in memory block "1" (see FIG. 11) described below. The power and communication control unit 302 delete from memory block "2" of the memory 303 of the dual I/F memory 219 the license data to be deleted by instruction via the I2C bus.

In step S921, the CPU of the portable terminal 102 accesses the dual I/F memory 219, reading via the RFID to acquire and confirm the above-described valid license information.

Although not illustrated in the above-described flowchart, error detection processing is executed in each processing. If an error is detected, retry processing is executed a predetermined number of times. If an error continues, error processing is executed and processing is terminated.

(License Data)

FIG. 10 illustrates an example configuration of the license database stored in the HDD 216.

One record of the license data stored in the HDD 216 of the digital MFP 103 corresponds to one specific function. Specifically, each record includes data of a function name, a specific function, and an abbreviated name illustrated in FIG. 8. When validating the license for each specific function, the license access number packaged with an application and the license number issued by the license server 101 are input and stored in the corresponding record. The valid/invalid status of the license is also input as data and stored in the corresponding record. When the license is normally operating, data indicating "normal" is input in the operating status field and stored in the corresponding record. As long as the present exemplary embodiment can be implemented, the table configuration is not limited to that illustrated in FIG. 10. The license access number may not be stored, and information about the date of license validation may be additionally stored.

(Dual I/F Memory Data)

FIG. 11 illustrates an example configuration of access rights and data stored in each block of the dual I/F memory 219.

In the dual I/F memory 219, under control of the main controller 211 via the I2C bus, areas in the memory 303 can be handled as memory blocks through merge and division processing. Referring to FIG. 11, the memory 303 is divided into four memory blocks (storage areas) "0" to "3." However, the number of memory blocks is not limited to four.

The main controller 211 can set an access right for each memory block via the I2C bus. Specifically, the main controller 211 can set the right to access (right to read/right to write) via the I2C and the right to access via the RFID for each memory block.

Referring to FIG. 11, as the right to access via the I2C, both the right to read and the right to write are set for all memory blocks "0" to "3." As the right to access via the RFID, only the right to read is set for memory blocks "0" and "1", and both the right to read and the right to write are set for memory blocks "2" and "3."

In memory block "0", for example, by the time of shipment of the digital MFP 103, the serial number of the digital MFP 103 is stored via the I2C so as to be unchangeable from outside. Specifically, the serial number in memory block "0" is read in step S903 (see FIG. 9).

In memory block "1", information about valid licenses for the digital MFP 103 (valid license information) is to be stored via the I2C so as to be confirmable from outside.

Memory block "2" is a block for storing data (license data) of the license validated via the RFID. When making license setting, the abbreviated name of the license, the license access number, and the license number are stored in memory block "2."

Specifically, as illustrated in FIG. 9, the license data is stored in memory block "2" in step S913 and read instep S916, and the information about the license validated based on the license data is stored in memory block "1" in step S920 and confirmed in step S921. When storing the valid license information in memory block "1", the main controller 211 deletes the license data in memory block "2."

The main controller 211, via the I2C bus, may make setting of the dual I/F memory 219 before the power of the digital MFP 103 is turned OFF under predetermined conditions, so that memory block "2" is writable from an external device while the power of the digital MFP 103 is OFF.

(License Deleting Flowchart)

Procedures for canceling a set license and deleting an unnecessary license will be described below with reference to FIG. 12.

FIG. 12 is a flowchart illustrating example license deletion processing according to the present invention. This flowchart illustrates operations of the digital MFP 103, the dual I/F memory unit 218 of the digital MFP 103, the portable terminal 102, and the license server 101.

Processing in steps S1210, S1211, S1213 to S1215 in the digital MFP 103 is implemented by the main controller 211 of the digital MFP 103 executing a relevant program computer-readably stored in the ROM 213. Processing in steps S1202, S1203, S1205, S1209, S1212 and S1216 in the dual I/F memory unit 218 is implemented by the power and communication control unit 302 of the dual I/F memory unit 218 executing a relevant program computer-readably stored in an internal storage unit (not illustrated). Processing in steps S1201, S1204, S1206 to S1208, S1217, S1218 and S1222 in the portable terminal 102 is implemented by the CPU (not illustrated) of the portable terminal 102 executing a relevant program computer-readably stored in the storage unit (not illustrated) of the portable terminal 102. Processing in steps S1219 to S1221 in the license server 101 is implemented by the CPU (not illustrated) of the license server 101 executing a relevant program computer-readably stored in the storage unit (not illustrated) of the license server 101.

Upon detection of a license deletion operation input by a user from the operation unit (not illustrated) of the portable terminal 102, the CPU of the portable terminal 102 executes the processing in step S1201.

In step S1201, the CPU of the portable terminal 102 accesses the dual I/F memory unit 218 of the digital MFP 103 via the RFID to issue a request. The portable terminal 102 is an active type RFID, and the dual I/F memory unit 218 is a passive type RFID.

In step S1202, in the dual I/F memory unit 218, the internal antenna 220 receives an access from the portable terminal 102 (an active type RFID), the power generation unit 305 generates the power, and the power and communication control unit 302 receives the request (signal) from the portable terminal 102.

In step S1203, in response to the request (a request for reading the serial number) from the portable terminal 102, the power and communication control unit 302 of the dual I/F memory 219 reads the serial number of the digital MFP 103 from memory block "0" of the memory 303 (see FIG. 11), and notifies the portable terminal 102 of the serial number via the RFID.

In step S1204, the CPU of the portable terminal 102 receives (acquires) the serial number of the digital MFP 103 from the dual I/F memory unit 218 via the RFID.

In step S1205, in response to the request (a request for reading information about the licenses set to the digital MFP 103) from the portable terminal 102, the power and communication control unit 302 of the dual I/F memory 219 reads information about the licenses set to the digital MFP 103 from memory block "1" of the memory 303 (see FIG. 11), and notifies the portable terminal 102 of the information via the RFID. Specifically, the power and communication control unit 302 reads information about valid licenses (valid license information) in the digital MFP 103 stored in memory block "1 of the memory 303 (see FIG. 11), and notifies the portable terminal 102 of the information via the RFID.

In step S1206, the CPU of the portable terminal 102 receives (acquires) information about the licenses set in the digital MFP 103 from the dual I/F memory unit 218 via the RFID, and displays the information on a display (not illustrated) of the portable terminal 102 to present the information to the user for confirmation.

In step S1207, the CPU of the portable terminal 102 receives from the operation unit (not illustrated) of the portable terminal 102 a user-selected license to be deleted out of the licenses displayed in step S1206. Upon detection of a user-selected license to be deleted from the operation unit, the CPU of the portable terminal 102 advances processing to step S1208. If a user input for canceling the processing is received from the operation unit, the CPU of the portable terminal 102 terminates the processing of this flowchart (not illustrated).

In step S1208, the CPU of the portable terminal 102 stores in the dual I/F memory 219 via the RFID the license data subject to deletion including the abbreviated name and invalidation setting of the function corresponding to the license to be deleted selected in step S1207.

In step S1209, the power and communication control unit 302 of the dual I/F memory unit 218 stores in memory block "2" of the memory 303 of the dual I/F memory 219 the license data subject to deletion specified to be deleted from the portable terminal 102 via the RFID. For example, the power and communication control unit 302 stores such information as "SC1 invalidated" and "PR1 invalidated" in memory block "2" (see FIG. 11) as license data subject to deletion.

In step S1210, the operator presses the power switch (not illustrated) of the digital MFP 103 to turn ON the power of the digital MFP 103. When the main controller 211 starts the activation processing according to the program stored in the ROM 213, the main controller 211 advances processing to step S1211.

In step S1211, according to the activation program executed when the power of the controller unit 201 is turned ON, the main controller 211 reads data (including the above-described license data subject to deletion) from the memory 303 of the dual I/F memory unit 218 via the I2C bus and stores the data in the RAM 212. Then, the main controller 211 confirms whether the license data subject to deletion is included in the data.

In step S1212, in response to an access via the I2C bus, the power and communication control unit 302 of the dual I/F memory unit 218 reads the data (including the above-described license data subject to deletion) in the memory 303 and transmits it to the I/O controller 215.

In step S1213, based on the above-described license data subject to deletion, the main controller 211 displays information about the license to be deleted (for example, the function name and specific functions as illustrated in FIG. 10) on the operation unit 204 and receives from the operation unit 204 a user-input confirmation for deletion. Then, upon reception of a user-input confirmation for deletion from the operation unit 204, the main controller 211 advances processing to step S1214. If a user input is received specifying that the license is not to be deleted, the main controller 211 terminates the processing of this flowchart (not illustrated).

In step S1214, the main controller 211 deletes the license. Specifically, the main controller 211 deletes the installed relevant program.

In step S1215, the main controller 211 makes sure that the program deleted in step S1214 cannot be actually executed, deletes the license access number, the license number, and the information about the operating status from a corresponding record in the license database (see FIG. 10), and changes the valid/invalid status of the license to "INVALID." In this case, the main controller 211 stores the license access number to be deleted in the RAM 212, and stores in the dual I/F memory unit 218 via the I2C bus the information about the license which has been confirmed to be deleted (license deletion information including the license access number). In this case, the main controller 211 further deletes via the I2C bus the above-described license data subject to deletion stored in the memory 303 of the dual I/F memory unit 218 confirmed in step S1213.

In step S1216, the power and communication control unit 302 of the dual I/F memory unit 218 stores in memory block "1" of the memory 303 of the dual I/F memory 219 the above-described license deletion information specified to be stored via the I2C bus. For example, the power and communication control unit 302 stores such information as "SC1 invalid, license access number", "PR1 invalid, license access number" in memory block "1" (see FIG. 11) as the license deletion information. The power and communication control unit 302 further deletes from memory block "2" of the memory 303 of the dual I/F memory 219 the license data subject to deletion specified via the I2C bus.

In step S1217, the CPU of the portable terminal 102 accesses the dual I/F memory 219 to read via the RFID and acquire the above-described license deletion information, and displays the information on the display (not illustrated) of the portable terminal 102 to present the information to the user.

In step S1218, after confirming that the license of the digital MFP 103 has been deleted, the CPU of the portable terminal 102 notifies the license server 101 of the above-described license deletion information and the device serial number acquired in step S1204.

In step S1219, the CPU of the license server 101 confirms using the device management table (see FIG. 5) and the license access management table (see FIG. 7) the license access number and serial number included in the license deletion information received from the portable terminal 102. In this step, specifically, the CPU of the license server 101 searches for the received serial number in the serial number list in the device management table (see FIG. 5) to acquire the device management number of the element in which the received serial number is registered. The CPU of the license server 101 further searches for the license access number in the license access number list in the license access management table (see FIG. 7) to confirm the element in which the received license access number is registered. Then, the CPU of the license server 101 confirms whether the device management number acquired from the above-described device management table is included in the device management number of the element.

In step S1220, the CPU of the license server 101 deletes the confirmed device management number from the element in the license access management table (see FIG. 7) confirmed in step S1219.

In step S1221, the CPU of the license server 101 transmits to the portable terminal 102 a notification (a license deletion completion notification) notifying that the license deletion processing is completed.

In step S1222, upon reception of the license deletion completion notification transmitted from the license server 101 via the network 104, the CPU of the portable terminal 102 displays a message indicating that the license deletion processing is completed on the display (not illustrated) of the portable terminal 102.

As described above, the present invention enables storing license data in the dual I/F memory unit 218 from the external portable terminal 102 via the RFID even when the power of the digital MFP 103 is OFF. Then, when the power of the digital MFP 103 is turned ON, the digital MFP 103 can read the license data from the dual I/F memory unit 218 and validate the corresponding license. This remarkably improves the operability in license setting and shortens the time of license validation.

Further, even when the power of the digital MFP 103 is OFF, the license data subject to deletion can be stored in the dual I/F memory unit 218 from the external portable terminal 102 via the RFID. Then, when the power of the digital MFP 103 is turned ON, the digital MFP 103 can read the license data subject to deletion from the dual I/F memory unit 218 and delete the corresponding license. This remarkably improves the operability in license deletion and shortens the time of license deletion.

The above-described configuration enables setting and deleting a license from outside even when the power of an image forming apparatus is OFF, thus shortening an operation time for installing and deleting an application to/from the image forming apparatus, and improving the operability in license setting and license deletion.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-191186 filed Sep. 2, 2011, which is hereby incorporated by reference herein in its entirety.

What is claimed is:

1. An image forming apparatus having a function of validating a license by inputting license information, the image forming apparatus comprising:
a storage unit configured to be accessible from an external device even if the power of the image forming apparatus is OFF; and
a control unit configured to, when the power of the image forming apparatus is turned ON, if license information has been written in the storage unit from an external device while the power of the image forming apparatus was OFF, validate a function of the image forming apparatus corresponding to the license information by using the license information,
wherein the storage unit is accessed via two different interfaces, including:
a passive RFIA; and
a bus.

2. The image forming apparatus according to claim 1, wherein individual unit identification information of the image forming apparatus is prestored in the storage unit so as to be unchangeable from an external device, and
wherein the license information is issued by using the individual unit identification information which has been read from the storage unit while the power of the image forming apparatus was OFF.

3. The image forming apparatus according to claim 2, wherein, after the external device transmits to a server the individual unit identification information which has been read from the storage unit while the power of the image forming apparatus was OFF and information for issuing a license input from the external device, the license information is issued by the server.

4. The image forming apparatus according to claim 1, further comprising:
a setting unit configured to set a storage area in the storage unit writable from an external device while the power of the image forming apparatus is OFF,
wherein the license information is stored in the storage area writable from the external device.

5. The image forming apparatus according to claim 1, wherein the control unit stores information about the validated function in the storage unit.

6. An image forming apparatus having a function of validating a license by inputting license information, the image forming apparatus comprising:
a storage unit configured to be accessible from an external device even if the power of the image forming apparatus is OFF; and
a control unit configured to, when the power of the image forming apparatus is turned ON, if license information has been written in the storage unit from an external device while the power of the image forming apparatus was OFF, validate a function of the image forming apparatus corresponding to the license information by using the license information, wherein, when the power of the image forming apparatus is turned ON, the control unit is configured to confirm the contents of the storage unit and, if an instruction for invalidating a function of the image forming apparatus is determined to have been stored in the storage unit from an external device while the power of the image forming apparatus was OFF, according to the instruction, the control unit is configured to invalidate the function of the image forming apparatus corresponding to the instruction.

7. The image forming apparatus according to claim 6, wherein according to the instruction, a function selected to be invalidated from the external device, is invalidated based on information about the validated function which has been read from the storage unit while the power of the image forming apparatus was OFF.

8. The image forming apparatus according to claim 6, wherein the instruction is stored in a storage area writable from the external device.

9. The image forming apparatus according to claim 6, wherein the storage unit includes two different interfaces: a passive type RFID and a bus.

10. A method for controlling an image forming apparatus having a function of validating a license by inputting license information, and a storage unit configured to be accessible from an external device even if the power of image forming apparatus is OFF, wherein the storage unit includes two different interfaces, including a passive and a bus, the method comprising:

performing control to validate a function of the image forming apparatus corresponding to the license information by using the license information when the power of the image forming apparatus is turned ON, if license information has been written in the storage unit from an external device while the power of the image forming apparatus was OFF.

11. A non-transitory computer readable storage medium on which is stored a computer program for making a computer execute a method for a control method for an image forming apparatus, wherein the image forming apparatus has a function that can be activated by a input of license information and comprises a storage device accessible from an external device even if the image forming apparatus is powered OFF, wherein the storage device includes two different interfaces, including a passive and a bus, the method comprising:

performing control to validate a function of the image forming apparatus corresponding to the license information by using the license information when the power of the image forming apparatus is turned ON, if license information has been written in the storage unit from an external device while the power of the image forming apparatus was OFF.

* * * * *